UNITED STATES PATENT OFFICE.

JOSEPH R. BROWN, OF NEW HAVEN, CONNECTICUT, ASSIGNOR OF ONE-HALF HIS RIGHT TO HENRY A. STEARNS, OF LINCOLN, R. I.

IMPROVEMENT IN PROCESSES FOR PURIFYING AND BLEACHING TALLOW, LARD, &c.

Specification forming part of Letters Patent No. 145,840, dated December 23, 1873; application filed December 18, 1873.

*To all whom it may concern:*

Be it known that I, JOSEPH R. BROWN, of the city and county of New Haven and State of Connecticut, have invented a new and Improved Process for Purifying and Bleaching Tallow, Lard, and other Fatty Matter; and I do declare that the following is a full, clear, and exact description thereof, which will enable others skilled in the art to use the same.

The object of my invention is to deprive tallow, lard, and other fatty matter of all impurities which impair their value and appearance, and particularly of all matter liable to decomposition, and at the same time bleach the same and improve their appearance, as also their value, as an article of commerce, and better adapted for the uses for which they are intended. Tallow and lard, when rendered in the usual manner, contain a large percentage of minute, even microscopic, cellular tissues containing oleine or elaine and albumen, which are liable to decomposition, particularly in the tallow and lard rendered during the summer months, imparting offensive smells to the same, while steam-rendered tallow also contains more or less glutinous matter, which readily decomposes, producing offensive odors, impairing the value of the article. Tallow also contains coloring matter, particularly when from lean and unhealthy animals, and when such is mixed with the other tallow, as is always the case when the business is carried on on a large scale, it imparts to it a dingy and a cloudy appearance, and it has to be sold as an inferior article at a less price than prime tallow. The oleine in such tallow easily separates from the stearine in ordinary summer temperature, and prevents the tallow from hardening, or, if packed in a cooler season, it is liable to separate and leak through the packages, causing loss by waste, as well as by a reduced value, on account of its unsightly appearance.

In order to remove the said defect and produce tallow or lard free from all impurities, hard and solid at all seasons of the year, sweet in taste, without any offensive smell, and possessing a clear, white color through the whole mass, I proceed as follows: Into a tank supplied either with a steam-jacket, or having a coil of steam-pipe placed within the same near the bottom, I place one-fourth as much water as the quantity of tallow or lard to be treated; the water having mixed with it two to two and a half per centum of strong sulphuric acid. I now heat the same to a temperature of about 180° Fahrenheit, and into this I draw the tallow or lard from the rendering-tank, and stir the same, while its temperature is maintained at 200° for half an hour. I now turn off the steam and let the whole settle for one hour or more, but do not allow the temperature to fall below 160°. Near the above tank, and, I prefer, sufficiently lower, so that the contents of the first may be drawn readily into the second, I place a tank having a steam-jacket or a coil of steam-pipe placed within and near the bottom of the same, and also a coil of perforated pipe placed near the bottom and connected with an air-pump. Into this second tank I place again from twenty to twenty-five per centum of water having dissolved in it from one-half to three-fourths of a pound of alum for each one hundred pounds of tallow or lard to be purified. The tallow or lard is now drawn from the first tank into the second, so as to retain in the first most of the water, and the impurities that have settled in the same. The whole mass is now raised to a temperature of above 200°, but not above 212°. The air-pump is started, and air is forced through the whole mass, so as to come in contact with every particle. This is continued from thirty to forty-five minutes, according to the depth of the tallow or lard. The steam is now turned off and the air-pump stopped, and the whole mass allowed to gradually cool for one hour. I now draw off from the bottom of the tank, as near as possible, all the water and settled precipitated impurities, after which I heat up the tallow or lard to 212°, and again start the air-pump, forcing air through the same, and gradually increasing the heat to 230°. When this has continued, according to the quantity, from fifteen to thirty minutes, and when the foam forming on top has a white pearly appearance, the air-blast is stopped and the heat allowed to fall to 200° Fahrenheit, at which temperature it is maintained for from thirty to sixty minutes to allow all impurities to settle, when the same may be drawn off into molds or packages, and the lard or tallow will be found of excellent quality, hard, pure, and of pearly whiteness. It is free from all impurities and well adapted for export, or to keep a long time without injury. It commands a ready sale at the highest prices.

Some tallow-renderers macerate the tallow in water which contains a small percentage of sulphuric acid before rendering the same. Such tallow I place at once into the second tank, and, after heating the same from 220° to 230°, I start the air-pump and force air through the same for from thirty to sixty minutes, until the appearance of the foam becomes white and pearly. I then allow it to become quiet by stopping the air-pump and maintaining the temperature at about 200° for about one hour, allowing all impurities to settle to the bottom, when it is ready for packing, and will be found hard, pure, and sweet.

When I wish to impart an extra fine color and taste to the tallow or lard, I draw the air, before it enters the air-pump, through a furnace and over a clear coke fire, in which a small quantity of bay-salt is continually falling, so as to vaporize it; and this chloride-of-sodium vapor is drawn in with the air and forced through the tallow and lard, while it is maintained at a temperature of from 220° to 230° for half an hour, when the same is allowed to settle as before, the temperature being maintained at about 200° Fahrenheit. A very fine, hard, and white tallow or lard of a sweet, pure taste is obtained which will keep for a very long time in perfect condition.

Having thus described my invention, what I claim, and desire to secure as new by Letters Patent, is—

1. Purifying and bleaching tallow, lard, and other fatty matter, by subjecting the same in succession to the action of sulphuric acid, alum, and atmospheric air, substantially as and for the purpose herein set forth.

2. Bleaching and purifying tallow or lard by forcing atmospheric air through the same when heated above 200°, but not above 230° Fahrenheit, as specified.

3. Bleaching and purifying tallow or lard by forcing through the same, when heated, air charged with the vapor of salt, as described.

JOSEPH R. BROWN.

Witnesses:
　GEO. W. JUDSON,
　JOSEPH A. MILLER.